United States Patent
Sato

[11] Patent Number: 5,156,445
[45] Date of Patent: Oct. 20, 1992

[54] PROJECTION-TYPE VEHICULAR HEADLAMP

[75] Inventor: Masakazu Sato, Shizuoka, Japan

[73] Assignee: Koito Manufacturing Co., Ltd., Kanagawa, Japan

[21] Appl. No.: 826,420

[22] Filed: Jan. 27, 1992

[30] Foreign Application Priority Data

Feb. 25, 1991 [JP] Japan .................................. 3-29866

[51] Int. Cl.⁵ .............................................. F21M 3/14
[52] U.S. Cl. ...................................... 362/61; 362/80
[58] Field of Search ............... 362/61, 80, 268, 296, 362/308, 227

[56] References Cited

U.S. PATENT DOCUMENTS

| | | |
|---|---|---|
| 4,677,532 | 6/1987 | Peitz et al. |
| 4,949,226 | 8/1990 | Makita et al. ............ 362/61 |
| 5,021,930 | 6/1991 | Yamada ................... 362/61 |
| 5,047,903 | 9/1991 | Choji ....................... 362/61 |
| 5,050,048 | 9/1991 | Hendrischk et al. ..... 362/61 |
| 5,081,564 | 1/1992 | Mizoguchi et al. ...... 362/61 |

FOREIGN PATENT DOCUMENTS 2070755 9/1981 United Kingdom .

Primary Examiner—Richard R. Cole
Attorney, Agent, or Firm—Sughrue, Mion, Zinn, Macpeak & Seas

[57] ABSTRACT

A vehicular headlamp in which the lamp body has a reduced susceptibility to deformation due to external forces and a high resistance to heat generated by a light projecting unit. The headlamp is a projection-type vehicular headlamp in which a light projecting unit including a light source, a substantially ellipsoidal reflector, and a projecting lens is mounted in a lamp chamber defined by a lamp body and a front lens. The lamp body has a light source attachment opening formed in a rear end wall thereof. In accordance with the invention, the rear end wall of the lamp body is partially expanded rearward to form expanded walls which protrude along the light source attachment opening.

3 Claims, 3 Drawing Sheets

PROJECTION-TYPE VEHICULAR HEADLAMP

BACKGROUND OF THE INVENTION

The present invention relates to a projection-type vehicular headlamp in which a light projecting unit, which includes a light source, a substantially ellipsoidal reflector, and a projecting lens, is mounted in a lamp chamber defined by a lamp body and a front lens. More particularly, the invention relates to a projection-type vehicular headlamp in which the lamp body has a light source attachment opening formed in its rear end wall.

A conventional vehicular headlamp of this type is constructed as shown in FIG. 5. That is, a light projecting unit 3 is mounted in a lamp chamber defined by a lamp body 1 and a front lens 2. The light projecting unit 3 includes a light source, namely, a light bulb $3a$, a substantially ellipsoidal reflector $3b$ in which the light bulb $3a$ is fitted, and a projecting lens $3d$ connected through a lens holder $3c$ to the reflector $3b$. The output light beam of the light bulb. reflected from the reflector $3b$ is converted into a substantially parallel light beam by the projecting lens $3d$, which beam advances forwardly of the headlamp. The light bulb $3a$ is inserted in a bulb fixing hole formed in the rear wall of the reflecting mirror $3b$ from behind. More specifically, the light bulb $3a$ is engaged with or disengaged from the bulb fixing hole through a bulb attachment opening $1a$ formed in the rear wall of the lamp body.

On the other hand, recently there has been a demand for miniaturization of vehicular headlamps dictated by styling demands. In order to meet this requirement, the lamp body 1 is set as close to the light projecting unit 3 as possible. However, since the bulb attachment opening is formed in the rear wall of the lamp body 1, the latter is liable to be deformed by external forces.

Further, in a projection-type vehicular headlamp, the light beam from the light source is concentrated before projected, and hence the light projecting unit 3 is considerably high in temperature. In spite of this fact, the bulb attachment opening $1a$ in the rear wall of the lamp body is covered with a rubber cover 6; that is, the lamp chamber is closed. This results in a difficulty in that, since the lamp body 1 is reduced in size, the lamp chamber around the heat source, namely, the light projecting unit 3, is decreased in volume, and accordingly the lamp body is more liable to be affected by heat. That is, when the headlamp is turned on, the lamp body is increased greatly in temperature by the heat generated by the light projecting unit, as a result of which the lamp body 1 may be deformed. Accordingly, the material of the lamp body is limited; that is, it is necessary to use a material high in heat resistance to manufacture the lamp body.

SUMMARY OF THE INVENTION

In view of the foregoing, an object of the invention is to provide a compact vehicular headlamp in which the lamp body is not subject to deformation by external forces, and has high heat resistance to the heat generated by the light projecting unit.

The foregoing and other objects of the invention have been achieved by the provision of a projection-type vehicular headlamp in which a light projecting unit comprising a light source, a substantially ellipsoidal reflector, and a projecting lens is mounted in a lamp chamber defined by a lamp body and a front lens, and the lamp body has a light source attachment opening in its rear end wall, in which, according to the invention, the rear end wall of the lamp body is partially expanded to form expanded wall portions which protrude along the light source attachment opening.

The expanded portions of the rear wall of the lamp body increase the rigidity of the lamp body around the light source attachment opening, which would otherwise be susceptible to deformation due to stress concentrated thereon when an external force is applied. The provision of the expanded wall portion results in an increase in the volume of the lamp chamber; that is, the amount of heat per unit area transmitted from the light projecting unit to the lamp body is deceased as much, thus preventing thermal deformation of the lamp body.

DESCRIPTION OF THE PREFERRED EMBODIMENTS

An example of a projection-type vehicular headlamp constructed in accordance with a preferred embodiment of the invention will now be described with reference to the accompanying drawings.

Figure 1:
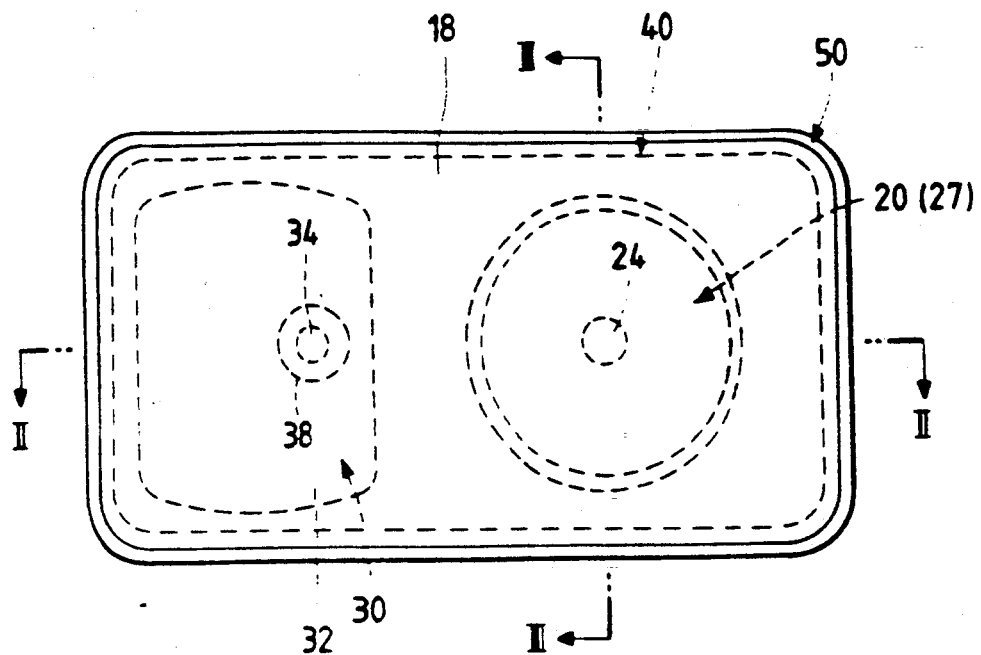
FIG. 1 is a front view of a projection-type vehicular headlamp constructed in accordance with a preferred embodiment of the invention.
Figure 2:
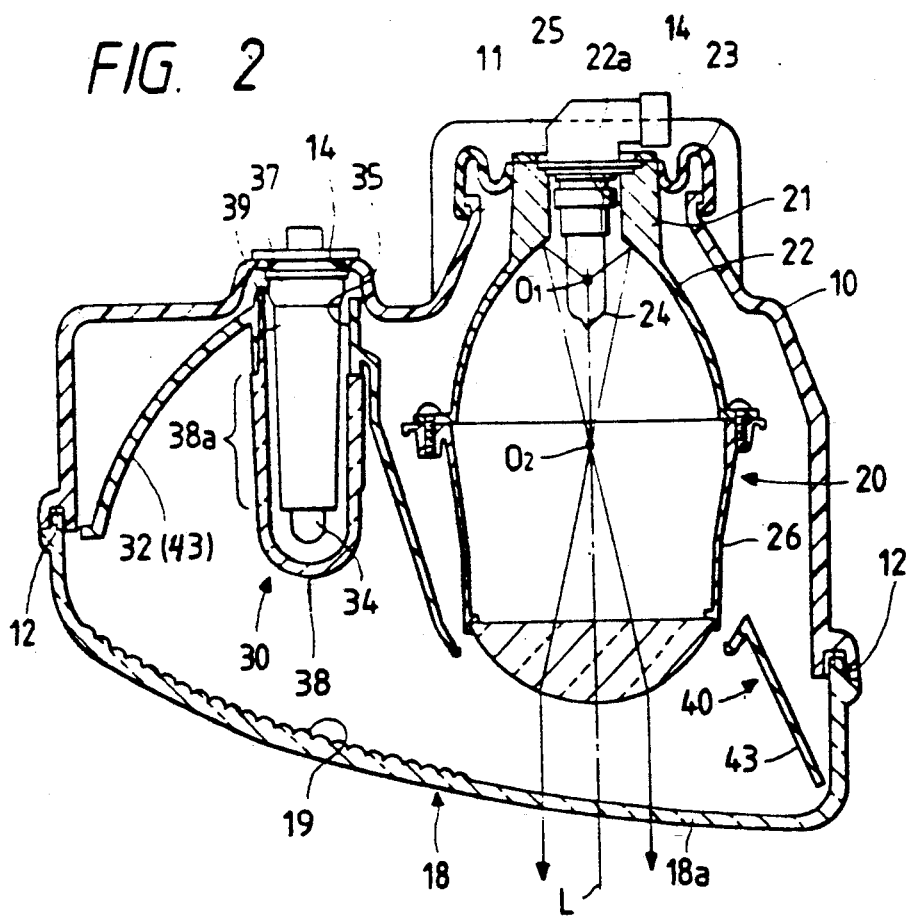
FIG. 2 is a horizontal sectional view of the headlamp shown in FIG. 1 taken along a line II—II in FIG. 1.
Figure 3:
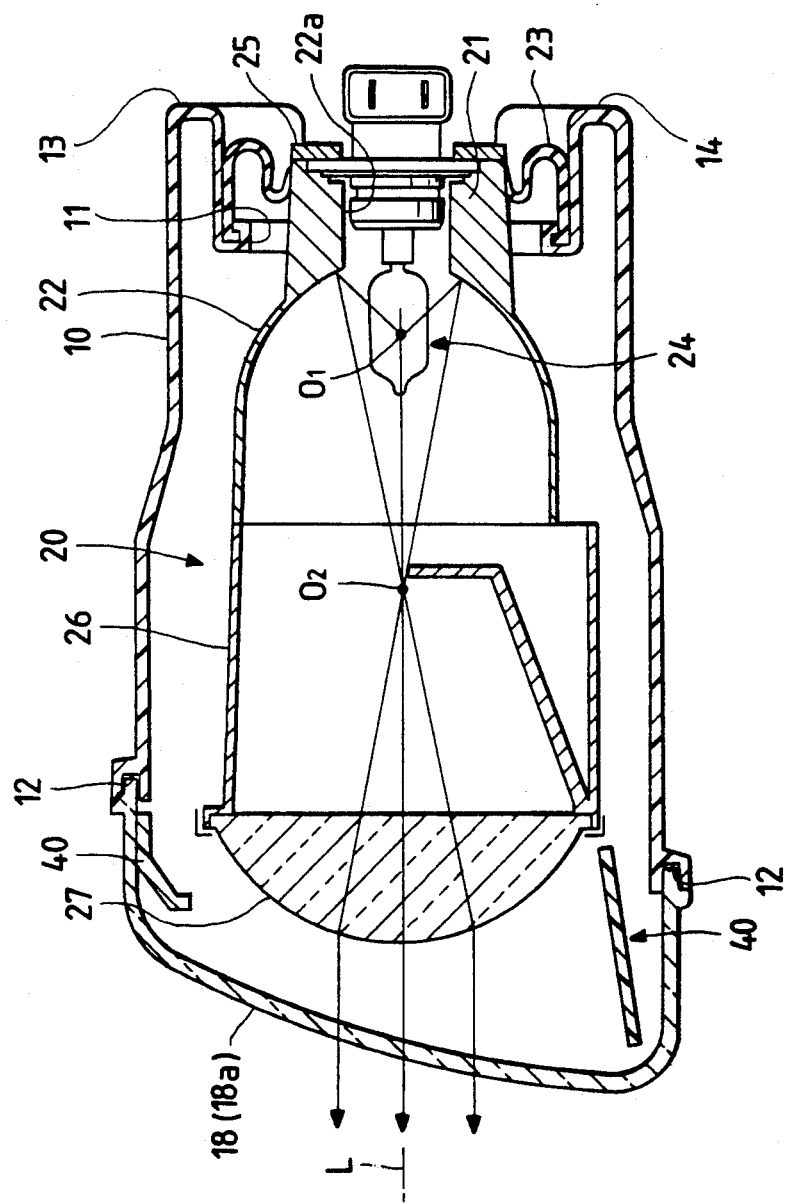
FIG. 3 is a vertical sectional view of the headlamp shown in FIG. 1 taken along a line III—III in FIG. 1.
Figure 4:
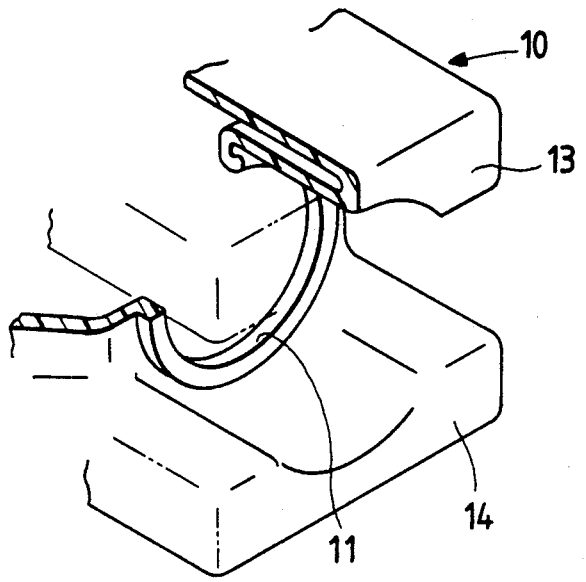
FIG. 4 is a perspective view showing a bulb attachment opening and components therearound in the headlamp of FIG. 1 as viewed from the rear.
Figure 5:
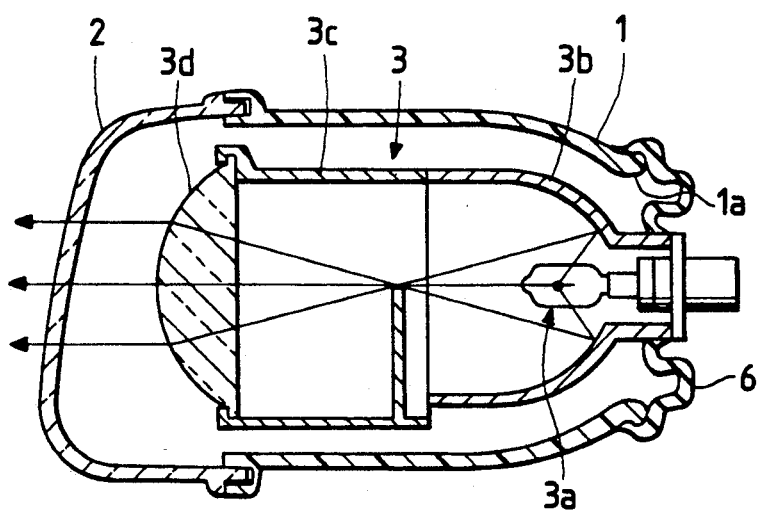
FIG. 5 is a vertical sectional view of a conventional projection-type headlamp.

The preferred embodiment of the invention is constructed as shown in FIGS. 1 through 4. More specifically, FIG. 1 is a front view showing a projection-type vehicular headlamp constructed according to the invention, FIG. 2 is a horizontal sectional view of the headlamp shown in FIG. 1 taken along a line II—II in FIG. 1, FIG. 3 is a vertical sectional view of the headlamp shown in FIG. 1 taken along a line III—III in FIG. 1, and FIG. 4 is a perspective view showing a bulb attachment opening and components in the vicinity thereof in the headlamp as viewed from the rear.

In these figures, reference numeral 10 designates a lamp body in the form of a rectangular container as viewed from the front. The lamp body has a front opening. A seal groove 12 is formed along the edge of the front opening of the lamp body 10. The base of a front lens 18 is fitted through a sealing agent in the seal groove 12. The lamp projecting unit 20 and a clearance lamp body 30 are arranged, as a headlamp, side by side in the lamp chamber.

The light projecting unit 20 includes a substantially ellipsoidal reflector 22 with a bulb inserting hole $22a$ formed in the rear end portion thereof, a light source, namely, a light bulb 24 fitted in the bulb inserting hole $22a$, and a projecting lens 27 connected through a lens holder 26 to the reflector 22. The light projecting unit 20 is supported by aiming mechanisms (not shown). The filament of the light bulb 24 is located near the first focal point $O_1$ of the reflector 22. The light beam formed from the light produced by the light bulb 24 and reflected from the reflector 22 advances forward through the second focal point $O_2$ of the reflector 22, and is formed into a substantially parallel light beam by projecting lens 27. The parallel light beam thus formed is projected from the lamp passing through the part 18a of the front lens 18 where no steps are formed. In FIG. 2, reference character L designates the optical axis of the headlamp. In the lamp body, the light projecting unit 20 is tiltably supported by aiming mechanisms (not shown). Hence, the optical axis L can be adjusted in position by tilting the light projecting unit 20 with the aiming mechanisms.

The lamp body 10 is reduced in size to the extent that the optical axis can be adjusted freely (i.e., to the extent that the light projecting unit 20 does not interfere with the lamp body when operated with the aiming mechanisms). The lamp body 10 has a circular opening 11 in the rear wall which is used to fix the light bulb. The light projecting unit 20 is positioned with its rear end portion, namely, its bulb-fixing-hole formed portion 21 protruding rearward through the circular opening 11. A leaf-spring-like bulb retainer 25 is provided for the bulb-fixing-hole formed portion 21 so as to fixedly secure the light bulb 24 in a bulb fixing hole 22a. A rubber cover 23 is provided between the edge of the bulb fixing circular opening 11 and the bulb-fixing-hole formed portion 21, thus closing the circular opening 11.

In accordance with the invention, the rear end wall of the lamp body is partially expanded rearward, thus providing an upper expanded wall 13 and a lower expanded wall 14 above and below the bulb fixing circular opening 11. These expanded walls 13 and 14, protruding rearward, increase the rigidity of the circular opening 11, which would otherwise be low in mechanical strength. In addition, the provision of the upper and lower expanded walls 13 and 14 results in an increase in the volume of the lamp chamber around the rear end portion of the light projecting unit. That is, in the vehicular headlamp of the invention, the lamp chamber is larger in volume than in a conventional vehicular headlamp with no such expanded walls. Thus, when the light projecting unit 20 generates heat, the amount of heat per unit area transmitted to the lamp body 10 is decreased as much, and accordingly the lamp body is much less susceptible to deformation by heat.

A cover 40 is arranged around the light projecting unit 20 surrounding the projecting lens 27 forming the front end portion of the light projecting unit. The cover 40 extends laterally, forming a reflector 32 for the clearance lamp body 30. That is, the cover 40 and the reflector 32 are formed as a single unit using the same injected resin. A mirror surface 43 is formed on the entire front surface of the cover 40, including the reflector 32, by vacuum-deposition of aluminum or by plating with chromium. The cover 40 is fixedly positioned in the lamp chamber defined by the lamp body 10 and the front lens 18 by coupling it to the lamp body 10 and the front lens 18 by lance engagement or with screws.

The clearance lamp body 30 includes the reflector 32 formed as a part of the cover 40; a light source for the clearance lamp body, namely, a light bulb 34 which is fitted in a bulb fixing hole 14 formed in the lamp body 10 in such a manner that it protrudes forward through a bulb inserting hole 35 formed in the rear end wall of the reflector 32, and a hood 38 engaged with the bulb inserting hole 35 in such a manner as to surround the light bulb 34. The hood 38 is in the form of a cylinder with a dome at one end and three hook-shaped legs 39 at the other end. The three hook-shaped legs 39 are engaged with engaging recess 37 formed in the wall of the bulb inserting hole 35 so that the hood 38 cannot come off. The hood 38 itself is clear. The outer cylindrical surface of the hood 38 except for the dome, that is, the outer cylindrical surface of the base end portion 38a of the hood 38, is plated with aluminum by vacuum deposition, thus appearing metallic in color. A number of vertically elongated cylindrical diffusing steps 19 are formed on the part of the front lens 18 which confronts the clearance lamp body 30. The light beam coming directly from the light bulb 34 and the light beam reflected from the reflector 32 are widely diffused by the cylindrical diffusing steps 19.

As is apparent from the above description, in the projection-type vehicular headlamp of the invention, the expanded walls forming parts of the rear wall of the lamp body increase the rigidity of the lamp body around the bulb attachment opening formed in the lamp body. Hence, the headlamp of the invention is less susceptible to deformation by external forces, and hence is high in durability. In addition, the provision of the expanded walls increases the volume of the lamp chamber, with the results that the lamp body is less prone to deformation by heat and the limitation in use of materials for forming the lamp body is lessened. That is, one of the primary difficulties accompanying conventional projection-type vehicular headlamps—the lamp body being adversely affected by the heat generated by the light projecting unit -- has been overcome by the invention.

I claim:

1. In a projection-type vehicular headlamp in which a light projecting unit comprising a light source, a substantially ellipsoidal reflector, and a projecting lens is mounted in a lamp chamber defined by a lamp body and a front lens, and said lamp body has a light source attachment opening formed in a rear end wall thereof, the improvement wherein said rear end wall of said lamp body is expanded rearward of said light source attachment opening to form expanded wall portions which protrude along said light source attachment opening, a bulb-fixing-hole portion formed at a rear end of said reflector protruding rearward through said light source attachment opening, said expanded wall portions providing rigidity around said light source attachment opening.

2. The projection-type vehicular headlamp of claim 1, wherein said expanded wall portions comprise an upper expanded wall and a lower expanded wall respectively extending above and below said light source attachment opening.

3. The projection-type vehicular headlamp of claim 1, further comprising a clearance lamp body mounted in said lamp body adjacent said light projecting unit.

* * * * *